United States Patent [19]
Crews et al.

[11] Patent Number: 5,590,606
[45] Date of Patent: * Jan. 7, 1997

[54] SHIPPING PLATFORM APPARATUS

[75] Inventors: Mitchell S. Crews, Geneva; Wayne H. Kuhn, Palos Park; M. Scott Bryll, Burbank, all of Ill.

[73] Assignee: Stone Container Corporation, Chicago, Ill.

[*] Notice: The term of this patent shall not extend beyond the expiration date of Pat. No. 5,388,531.

[21] Appl. No.: 326,544

[22] Filed: Oct. 20, 1994

Related U.S. Application Data

[63] Continuation of Ser. No. 876,572, Apr. 30, 1992, Pat. No. 5,388,531, which is a continuation of Ser. No. 634,426, Dec. 27, 1990, abandoned.

[51] Int. Cl.$^6$ ................................................. B65D 19/00
[52] U.S. Cl. ................................... 108/51.3; 108/56.1
[58] Field of Search ........................... 108/51.3, 56.3, 108/51.1, 56.1

[56] References Cited

U.S. PATENT DOCUMENTS

| | | | |
|---|---|---|---|
| 2,631,724 | 3/1953 | Wright | 108/51.3 X |
| 3,266,444 | 8/1966 | Budd | 108/51.3 X |
| 3,407,758 | 10/1968 | Simkins | 108/51.3 |
| 3,605,651 | 9/1971 | Stewart | 108/56.3 |
| 3,685,463 | 8/1972 | Francis | 108/56.3 |
| 4,228,744 | 10/1980 | Moore | 108/51.3 |
| 4,244,766 | 1/1981 | Yellen | 108/51.3 X |
| 4,850,284 | 7/1989 | Degroot et al. | 108/51.3 X |
| 5,388,531 | 2/1995 | Crews et al. | 108/56.3 X |

FOREIGN PATENT DOCUMENTS

| | | | |
|---|---|---|---|
| 603977 | 11/1990 | Australia . | |
| 569513 | 1/1959 | Canada | 108/51.3 |
| 2466402 | 4/1981 | France . | |
| 2676994 | 12/1992 | France | 108/51.3 |
| 7211803 | 7/1972 | Germany . | |
| 2520443 | 11/1975 | Germany | 108/51.3 |
| 697232 | 9/1953 | United Kingdom | 108/51.3 |

*Primary Examiner*—Jose V. Chen
*Attorney, Agent, or Firm*—Dick and Harris

[57] ABSTRACT

A substantially recyclable shipping platform apparatus for supporting and transporting loads, in which the apparatus is easily disposable and recyclable after use. A plurality of substantially elongated pylons are attached between a top platform and a bottom panel to increase the integrity of the apparatus to more effectively support the load material placed upon the platform. The bottom panel is constructed with articulateable flaps which are used to secure the pylons to the bottom panel. Each of these flaps are configured to maximize contact with, and stability of, the pylons, and are further configured to correspond to the specific shape of the interior region of each respective pylon they are attached to. A tear strip may be embedded within the platform and/or bottom panel for purposes of reducing the overall size of the apparatus when disposal is desired.

17 Claims, 3 Drawing Sheets

SHIPPING PLATFORM APPARATUS

This is a continuation, of application Ser. No. 07/876, 572, filed Apr. 30, 1992 now U.S. Pat. No. 5,388,531 which is a continuation of 07/634,426, now abandoned.

The present invention relates in general to shipping platforms, and, in particular, to a substantially recyclable shipping platform apparatus for supporting and transporting loads by conventional material handling equipment, which apparatus is constructed and configured to facilitate disposal of the apparatus after use.

For many years, industry has utilized shipping platforms for purposes of storing, handling and transporting a vast array of load materials. While most such platforms comprise pallets formed of wood, more recently several such shipping platforms have been constructed out of substantially recyclable fibrous material such as paperboard. These prior art paperboard shipping platforms have typically relied upon a plurality of rolled, circular pylon members for structural support of the load material, and not a plurality of substantially elongated pylons operably configured, positioned, and attached to the apparatus in such a way as to increase the total shear strength of the load bearing platform—thereby allowing for acceptance of an increased weight load. Furthermore, few if any prior art devices have secured the pylon to the apparatus, by among other things, optimal contact and affixation of articulateable flaps integrally formed within one of the panels of the apparatus itself.

Additionally, although substantially recyclable shipping platforms of reduced load bearing capability do exist, a problem still remains with respect to frangibility and disposal of the apparatuses after use. Such shipping platforms, although relatively light in weight, are quite burdensome with respect to their overall size. Accordingly, these products cannot just simply be placed in a conventional paper compactor or other disposal container. Indeed, to facilitate insertion into such bins or containers, without, for all practical purposes, causing the shipping platform to exceed the size limits of the compactor, or to occupy a substantial portion of the bin or container, an individual would have to exert a great deal of effort in physically dismantling and then crushing the apparatus—or, in the alternative placing the apparatus in an industrial size trash compactor not readily available to some users of such shipping platforms.

It is thus an object of the present invention to provide a shipping platform apparatus which is frangible, wherein such frangibility is easily accomplished with little effort, to accordingly facilitate the placement of the shipping platform in a conventional garbage bin or container when disposal is desired—without causing the apparatus to occupy substantial amounts of space therein.

It is further an object of the present invention to provide a shipping platform apparatus for four-way entry by conventional material handling devices, which is constructed of a substantially recyclable and/or biodegradable material which can be disposed after use, so as to reduce further damage to the ecology typically caused by non-biodegradable and/or non-recyclable material, while simultaneously conserving natural resources. At the same time, it is an object to provide a low-cost, lightweight, one way shipping platform which can be fabricated in a facilitated manner by automatic formation equipment.

It is still further an object of the present invention to provide a shipping platform apparatus which is configured to have relatively strong shear strength; without protruding fasteners, thereby enabling an increased load to be supported thereon.

These and other objects of the present invention will become apparent in light of the present specification and drawings.

SUMMARY OF THE INVENTION

The present invention comprises a substantially recylable shipping platform apparatus for supporting and transporting loads by conventional tined material handling devices. The apparatus is easily disposable and substantially recylable after use, and comprises a substantially flat planar load-bearing platform means which is used for supporting the load. The platform means is formed of a substantially paper material and has a top surface and a bottom surface opposite the top surface. Accordingly, the load is capable of resting upon the top surface of the platform means during the storage and transporting of the load.

A substantially flat planar bottom panel means is distally spaced and positioned parallel to and below the platform means. The bottom panel means supports and bears the weight of both the platform means and the load. This bottom panel means is likewise formed of a substantially paper material and has a top surface and a bottom surface opposite to the top surface.

A plurality of substantially elongated pylon means are operably positioned between the platform means and the bottom panel means so as to facilitate the insertion, maintenance and removal of the tines of the conventional tined material handling devices therebetween. In addition, these pylon means further maximize the supportable strength of the apparatus while providing balance, stability and support to the shipping platform apparatus during use thereof. Each of these pylon means have a top end and a bottom end opposite to the top end, as well as an outer surface, and an interior region formed by an inner surface or interior wall. The top end of the pylon means are secured to the bottom surface of the platform means, and the bottom end of each of the pylon means are secured to the top surface of the bottom panel means. Pylon attachment means are used for operably securing the top end of each of the pylon means to the bottom surface of the platform means, as well as for securing the bottom end of the pylon means to the top surface of the bottom panel means.

In one embodiment of the invention, aperture means may be positioned through various locations in the bottom panel means. These aperture means enable effective cooperation of the shipping platform apparatus with conventional material handling devices which utilize fork tines for insertion between the platform means and the bottom panel means, for purposes of raising, relocating and/or lowering the shipping platform apparatus, and accordingly the load as well. With such handling devices, wheel or weight bearing projections may emanate through the aperture means as a load on the shipping platform is raised.

In another preferred embodiment of the invention, the pylon attachment means comprise a plurality of articulateable flap means which are integrally formed within the bottom panel means about a configuration of folds that closely match the shape of the interior wall of the interior region of the pylon means. These folds facilitate the attachment of the articulateable flap means to the inner surface or wall of the interior region of the particular pylon means located proximate to the bottom ends of the pylon means. The flap means themselves, have a first side and a second side opposite the first side, wherein the first side is operably attachable to the inner surface of the interior region of the pylon means by adhesive attachment means positioned therebetween. While many adhesives can be used, one such adhesive may be polyvinyl acetate adhesive, which, when attached to the inner surface of the interior region of the pylon means facilitates the secured attachment therebetween.

In another preferred embodiment of the invention, the bottom end of each of the pylon means are further secured to the bottom panel means by adhesive attachment means positioned between the bottom ends of the pylon means in the region of the bottom panel means immediately surrounding the configuration of articulateable flap means folds. It is preferred that each of the articulateable flap means be configured to have a maximized height with respect to the attached contact with the inner surface of the interior region of the pylon means, for optimal securement and stabilization of the pylon means to the platform means.

In the preferred embodiment of the invention, the articulateable flap means comprise a first side flap, a second side flap, a first end flap and a second end flap, each of which have a scalene triangular configuration. The first and second side flaps are positioned contiguous to each of the first and second end flaps. Accordingly, the first side flap has its apex in abutment with the apex of the first end flap, and the second side flap has its apex in abutment with the second end flap so as to form a configuration which maximizes the height of attachment of the articulateable flap means to the inner surface of the interior region of the pylon means.

Also in the preferred embodiment of the invention, the articulateable flap means comprise a plurality of triangular shaped flaps operably positioned within a substantially oval configuration. Each of the triangular shaped flaps are arranged in a substantially interwoven configuration, thereby giving it a star-burst like appearance, so as to maximize the height of attachment of the articulateable flap means to the inner surface of the interior region of the pylon means. As previously mentioned, the top surface of each of the flap means can be treated with an adhesive which may be hot melted or otherwise positioned into secured attachment with the inner surface or wall of the interior region of the respective pylon means.

In the preferred embodiment of the invention, the pylon attachment means include adhesion attachment means operably positioned between the top end of each of the pylon means and at least a portion of the bottom surface of the platform means for restrained securement therebetween.

The pylon attachment means can comprise a plurality of articulateable flap means integrally formed within the platform means about a configuration of folds that closely match the shape of the interior region of the pylon means for attachment of the articulateable flap means to the inner surface of the interior region of the pylon means proximate to the bottom ends of each of the respective pylon means. These articulateable flap means have a first side and a second side opposite the first side, wherein the first side is operably attachable to the inner surface of the interior region of the pylon means by adhesive attachment means positioned therebetween. Once again, the adhesive that can be used is a polyvinylacetate adhesive material. The configuration of the articulateable flap means themselves, have a maximized height with respect to attached contact within the inner surface of the interior region of the pylon means, for optimal securement and stabilization of the pylon means to the platform means.

While the flaps may each form an isosceles or equilateral triangle, in an alternative configuration, the articulateable flap means comprise a first side flap, a second side flap, a first end flap and a second end flap, each of which having a scalene triangular configuration. The first and second side flaps are positioned continguous to each of the first and second end flaps. The first side flap has its apex in abutment with the apex of the first end flap, and the second side flap has its apex in abutment with the second end flap so as to form a configuration which maximizes the height of attachment of the articulateable flap means to the inner surface of the interior region of the pylon means.

In another embodiment of the invention, the articulateable flap means comprise a plurality of triangular shaped flaps operably positioned within a substantially oval configuration so as to impart a star-burst like pattern thereto. Each of the triangular shaped flaps are arranged in a substantially interwoven configuration so as to likewise maximize the height of attachment of said articulateable flap means to the inner surface of the interior region of the pylon means upon articulation thereof.

In the preferred embodiment of the invention, at least one of the plurality of substantially elongated pylon means comprise a relatively oval shaped pylon member configuration. In another embodiment, at least one of the plurality of substantially elongated pylon means comprise a relatively rectangular shaped pylon member configuration. In yet another embodiment of the invention, at least one of the plurality of substantially elongated pylon means comprise two or more relatively circular members substantially adjoining one another peripherally and in successive abutment. Alternatively, the pylon shape may comprise an elongated triangle, pentagon, hexagon etc.

In the preferred embodiment of the invention, the shipping platform apparatus further includes frangibility means positioned across the substantial length of at least one of the longitudinal and transverse dimensions, of at least one of the platform means and bottom panel means. These frangibility means serve to facilitate reduction of the overall shipping platform apparatus after use, so as to facilitate disposal of the apparatus by way of conventional compactor means.

In the preferred embodiment of the invention, the frangibility means comprise a first tear strip means which is integrally formed within the platform means, and a second tear strip means which is integrally formed within the bottom panel means. It is preferred that the first tear strip means be embedded within the platform means so as to facilitate foldability of the platform means upon removal of the first tear strip and the second tear strip. The second tear strip means is preferably embedded within the bottom panel means in such a manner as to completely sever the bottom panel means upon removal of the second tear strip, to in turn, facilitate folding of at least a portion of the top surface of the bottom panel means over at least a portion of the top surface of the platform means, so as to reduce the overall linear dimension of the shipping platform apparatus. This tear strip can be a tape or wire tear member.

In the preferred embodiment of the invention, the platform means, the bottom panel means, as well as the pylon means are each constructed from at least one layer of substantially biodegradeable corrugated paperboard material, although other paper materials are also contemplated.

In the preferred embodiment of the invention, the platform comprises three layers of substantially biodegradable corrugated paperboard material, in which the corrugation of each layer of the corrugated paperboard are positioned in relative uniform parallel alignment with one another. The bottom panel means comprises two layers of a substantially biodegradeable corrugated paperboard material, in which the corrugation of each layer of the corrugated paperboard are positioned in relative uniform parallel alignment with one another. The relatively uniform parallel alignment of the corrugations of the three layers of the corrugated paperboard material of the platform means may be positioned above and transverse to the relatively uniform parallel alignment of the corrugations of the two layers of corrugated paper material of the bottom panel means, so as to impart increased unidirectional strength to the shipping platform apparatus in both the longitudinal and transverse directions. Alternatively, the corrugations in the platform means and bottom panel means may be parallel to increase the beam strength of the shipping platform apparatus.

In one embodiment of the invention, the substantially recylable platform apparatus is constructed from multiple layers of paperboard material.

In the preferred embodiment of the invention, the aperture means which are located in the bottom panel means, comprise at least one pair of rectangles positioned in opposite sides of the bottom panel. Alternatively, circular apertures may be utilized, or a perforated disk, in the shape of a rectangle or circle may be employed, which disk remains in the bottom panel means for increased rigidity until "popped-out" by, for example, penetration by a supporting member of a jack-type material handling device.

Also, in one embodiment of the invention, the substantially elongated pylon means are constructed from continuously rolled multiple layers of paperboard material. In yet another embodiment of the invention, the substantially elongated pylon means are constructed from multiple layers of corrugated paperboard. In still another embodiment of the invention, the substantially elongated pylon means may be constructed from a substantially plastic material.

In one embodiment of the invention, the platform means and the bottom panel means are coated with a substantially moisture impervious material. Other coating materials may be used, such as coatings which are substantially fire resistant, and/or coatings which are substantially insect resistant.

In the preferred embodiment of the invention, the platform means as, well as the bottom panel means each have a substantially congruous rectangular configuration.

BRIEF DESCRIPTION OF THE DRAWINGS

FIG. 9 of the drawings is a partial cross-sectional side view of the shipping platform apparatus, showing in particular, the cooperation of a conventional material handling fork tine positioned between the platform means and bottom panel means and adjacent the pylon means, and more specifically the location of a load-supporting wheel of the fork tine positioned in the aperture means of the bottom panel means;

FIG. 18 of the drawings is a perspective view of one type of articulateable flap means, showing in particular, the fold lines surrounding the flaps themselves, which substantially correspond to the interior region of the pylon means it will secure, as well as the height-maximizing configuration of the flaps themselves; and, FIG. 19 the drawings is a perspective view of one type of articulateable flap means, showing in particular, the fold lines surrounding the flaps themselves, which substantially correspond to the interior region of the pylon means it will secure, as well as the width and height-maximizing configuration of the flaps themselves.

DETAILED DESCRIPTION OF THE DRAWINGS

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 1:
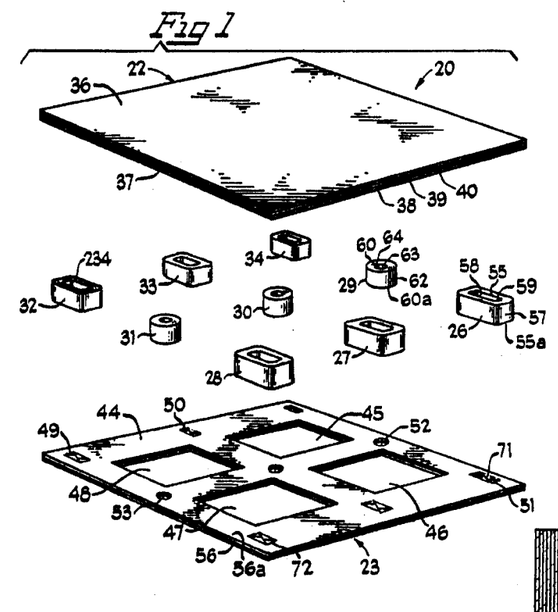
FIG. 1 the drawings is an exploded perspective view of the present shipping platform apparatus showing, in particular, the platform means, the bottom panel means, and the pylon means which are positioned therebetween.

Shipping platform apparatus 20 is shown in FIG. 1 as including platform means 22, bottom panel means 23, and pylon means 26 through 34 which separate platform means 22 from bottom panel means 23. Platform means 22 comprises top load bearing surface 36 and bottom surface 37, and is preferably constructed of three paperboard corrugated layers 38, 39 and 40, although other paper materials and numbers of layers are also contemplated. Bottom panel means 23 comprises top surface 44, a bottom surface (not shown), and aperture means 45, 46, 47 and 48. Although each of these apertures are shown to have substantially rectangular shaped openings, other configurations as well as other sizes, can also be utilized. Bottom panel means 23 further includes articulateable flap means, such as articulateable flap means 49, 50, 51, 52 and 53, which are used to secure each respective pylon means, such as pylon means 32, 26, 29 and 31, to bottom panel means 23. Ideally, as will be explained in greater detail in FIGS. 10, 11 and 12, each of the articulateable flap means are configured to have fold lines, such as fold line 72, which substantially conform to the particular shape of the interior region, such as interior region 58, of the respective pylon means 26 through 34, for facilitating secured attachment therebetween. In addition, it is also preferred that bottom panel means 23, be constructed of two corrugated paperboard layers, 56 and 56a, although, like platform means 22, other paper materials, as well as numbers of layers, are also contemplated.

As shown in FIG. 1, preferably the corrugations of platform means 22 are all parallel in sheets 38 through 40, which run transverse to the corrugation, of sheets 56 and 56a in bottom panel 23.

Pylon means 26 through 34, which are used not only to separate platform means 22 from bottom panel means 23, but are also used as structural supports when a load is actually placed upon platform means 22, each comprises a top end, such ends 55 and 60, a bottom end, such as bottom ends 55a and 60a, an outer surface, such as outer surfaces 57 and 62, an interior region, such as interior regions 58 and 63, as well as an inner surface, or interior wall, such as interior walls 59 and 64.

When shipping platform apparatus 20 is fully assembled, bottom side 37 of platform means 22, will abut with top ends, such as top ends 55 and 60, of the pylon means, such as pylon means 26 and 29, respectively, and bottom ends, such as bottom ends 55a and 60a, of each of the pylon means, such as pylon means 26 and 29, respectively, will abut in operable attachment with top surface 44 of bottom panel means 23. Furthermore, as will be shown in greater detail, each of the pylon means 26 through 34, will be positioned over articulateable flap means, such as articulateable flap means 49 through 53, so that the flaps themselves will be exposed to the respective interior region of a pylon, such as interior region 58 and 63, of each of the pylon means. It is preferred that shipping platform apparatus 20 be constructed of a substantially recyclable paper material such as corrugated paperboard—inasmuch as one of the objectives of the invention is to conserve natural resources and reduce further damage to the eco-system. Also shown in FIG. 1 is adhesive means, such as adhesive means 71, as applied to articulateable flap means for attachment with pylon means, such as pylon means 26, and adhesive means 234 as applied to the top end of pylon means, such as pylon means 32, for attachment to bottom surface 37 of platform means 22.

Figure 2:
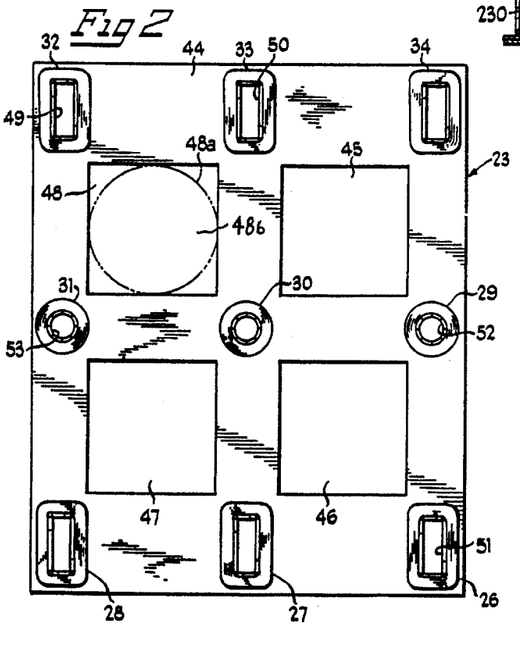
FIG. 2 of the drawings is a top plan view of the bottom panel means, and the pylon means, prior to attachment of the platform means thereon, showing in particular, the articulateable flap means securing each of the pylon means to the bottom panel means, as well as showing the rectangular shaped aperture means of the bottom panel means.
Figure 3:
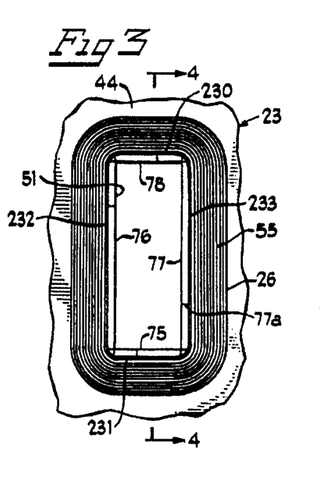
FIG. 3 of the drawings is an enlarged top view of one of the pylon means as attached to the bottom panel means by the articulateable flap means, and, showing in particular, the adhesive used to secure each of the flaps to the interior wall of the respective pylon means.
Figure 4:
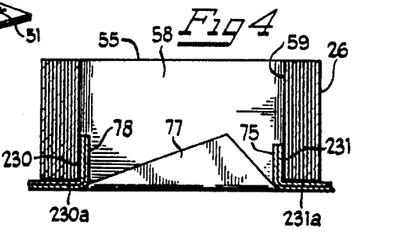
FIG 4 of the drawings is an elevated partial cross-sectional side view of one of the pylon means shown in FIG. 3, taken along lines 4—4 and looking in the direction of the arrows, as attached to the bottom panel means by the articulateable flap means, showing in particular, the operable positioning and maximized height of contact of the individual flaps as attached to the interior surface of the respective pylon means.
Figure 5:
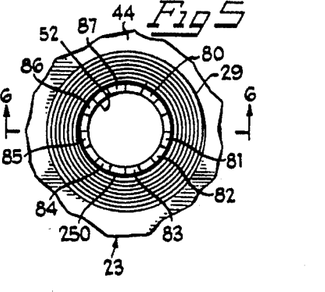
FIG. 5 of the drawings is an enlarged top view of one of the substantially circular pylon means shown in FIG. 1, showing in particular, the secured attachment of the articulateable flap means to the interior surface of the circular pylon means, as well as the adhesive used for attachment therebetween.

Top surface 44 of bottom panel means 23, is shown in FIG. 2, prior to attaching platform means 22 to top ends, such as top ends 55 and 60, (as shown in FIG. 1) of the pylon means, such as pylon means 26 through 34. Each of the pylon means are secured to top surface 44 of bottom panel means 23, by articulateable flap means, such as articulateable flap means 49 through 53. Each articulateable flap means, such as articulateable flap means 51, comprise a plurality of individual flap elements, such as flap elements 75 through 77, as shown in FIG. 3. The top surface of these flap elements are coated with an adhesive, such as adhesive 71, as shown in FIG. 1, prior to their attachment to interior walls, such as interior wall 59, of the pylon means, such as pylon means 26 as shown in FIG. 4. One type of adhesive coating which is recommended for use is a polyvinyl acetate, although any other type of suitable adhesive can also be used.

Figure 6:
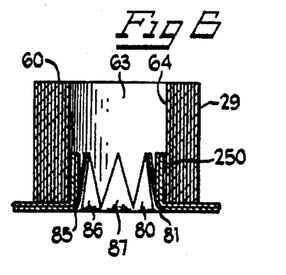
FIG. 6 the drawings is an elevated partial cross-sectional side view of the circular pylon means shown in FIG. 5, taken along lines 6—6 and looking in the direction of the arrows, showing in particular, the star-burst pattern of the articulateable flap means, the operable positioning and maximized height of contact of the individual flaps to the interior surface of the pylon means, as well as the adhesive used to secure the flap means thereto.
Figures 9, 18, 19:
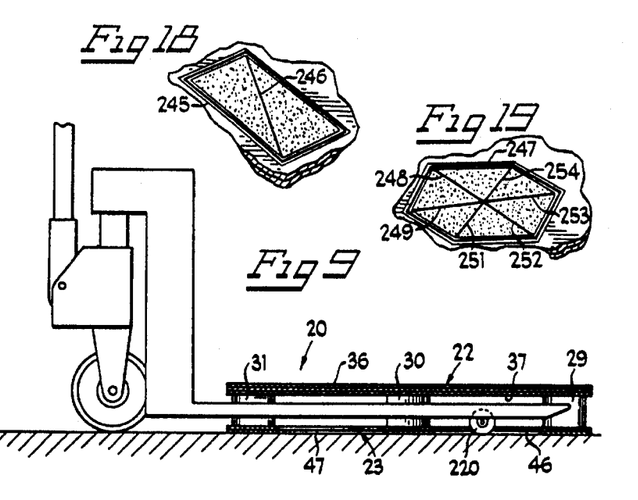

Actual attachment of flap elements, such as flap element 75 through 78, as shown in FIG. 3, to the pylon means, such as pylon means 26, is accomplished by forcing the respective flap elements, into abutment with the interior walls, such as interior walls 59 and 64, as shown in FIG. 3 and FIG. 6, of pylon means 26 through 34. The adhesive, such as adhesive 71, applied to flap elements 75 through 78, as shown in FIG. 1, may be applied manually, by machine, or both to the interior walls of the respective pylon means for secured attachment therebetween. Also shown in FIG. 2, are aperture means 45 through 48 which facilitate operable acceptance of wheels 220 of a conventional material handling device, as shown in FIG. 9.

Also shown in FIG. 2 is alternative, substantially circular shaped aperture means 48a. Inasmuch as aperture means, such as aperture means 48a, are only necessary when apparatus 20 is raised and lowered by specific jack-type material handling devices requiring such apertures (such as the type shown in FIG. 9), it is contemplated that bottom panel means 23 alternatively be configured with disk element 48b which may be attached by a perforated region, in relatively planer relationship to top and bottom surfaces of bottom panel means 23. Accordingly, when necessary, disk element 48b may be automatically detached from bottom panel means 23 upon exertion of load-bearing force to disk element 48b itself—thereby providing the popping open aperture means 48a. Until that time, disk 48b contributes to the rigidity of bottom panel means 23. Although such detachment piece is shown as a circular disk shaped element 48b, other geometrically shaped configurations are also contemplated.

Two different shaped constructions of pylon means, such as pylon means 26 and 29, as shown in FIG. 1 and FIG. 2, are shown in FIGS. 3 through 6, along with their respective articulateable flap means 51 and 52 as attached thereto. In one embodiment, the invention includes two differently shaped pylon means, such as the substantially cylindrically shaped pylon means 29 through 31, and the substantially elongated, rectangular shaped pylon means 26, 27, 28, 32, 33 and 34, as shown in FIG. 1, and that each of these shaped pylons be secured to top surface 44 of bottom panel means 23 by individual flap elements, such as flap elements 75 through 78, and flap elements 80 through 87, which comprise articulateable flap means, such as articulateable flap means 51 and 52, respectively. Furthermore each of these flap elements have fold lines, such as fold line 72 as shown in FIG. 1, which are substantially similar to the configuration of the respective interior regions, such as interior regions 58 and 63, of the pylon means, such as pylon means 26 and 29, respectively, to which they are attached.

Figures 11, 12:
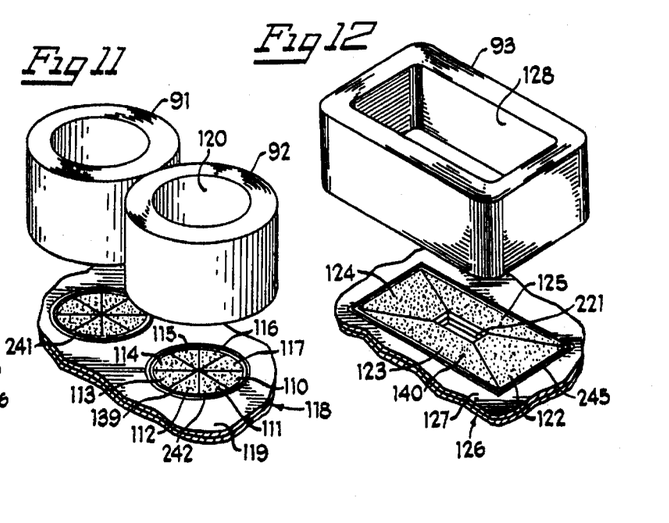
FIG. 11 of the drawings is an exploded perspective view of two substantially cylindrically shaped pylon means in abutment with each other, along with the star-burst patterns of the respective articulateable flap means used to secure the pylon means to the bottom panel means, showing in particular the fold line configurations of the articulateable flap means which each substantially conforms to the configurations of the interior regions of each of the cylindrically shaped pylon means.
FIG. 12 of the drawings is an exploded perspective view of a substantially rectangular shaped pylon means, along with the configuration of the respective articulateable flap means used to secure the pylon means to the bottom panel means, particularly showing the fold line configuration of the articulateable flap means which substantially conforms to the configuration of the interior region of the rectangular pylon means.

When substantially rectangular shaped articulateable flap means, such as articulateable flap means 51, are fully articulated, each of the respective flap elements, such as flap elements 75 through 78, may be positioned in abutment with a substantial portion of an interior wall, such as interior wall 59, of each of the rectangular shaped pylon means, such as pylon means 26, and secured thereto by adhesive means 231, 232, 230 and 233. Furthermore, each of these flap elements have been configured in such a manner as to maximize the height of contact with the respective interior wall they will be affixed to, for secured attachment therewith. As is true with the rectangular shaped flap means, when the substantially cylindrically shaped flap means, such as flap means 52 are fully articulated, each of the respective flap elements, such as flap elements 80 through 87, will have been forced into abutment with a substantial portion of interior walls, such as interior wall 64, of each cylindrically shaped pylon means, such as pylon means 29, and secured thereto by adhesive means 250. The star-burst like pattern of articulateable flap means, such as flap means 52, have been configured to maximize the height of contact, and accordingly securement to the interior wall, such as interior wall 64, of each of the cylindrically shaped pylon means, such as pylon means 29. Although one embodiment shows two particular configurations of articulateable flap means, such as articulateable flap means 51 and 52, other configurations are also contemplated for pylon means having the same geometrically elongated shape as those pylon means as shown in FIGS. 11 and 12. Also shown in FIGS. 3 through 6 are apex 77a of flap element 77, top ends 55 and 50 of pylon means 26 and 29, respectively, and adhesive means 230a and 231a which can be applied to the bottom ends, such as bottom end 55a, as shown in FIG. 1, of pylon means, such as pylon means 26.

Figure 7:
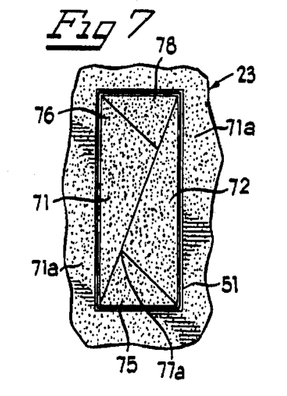
FIG. 7 of the drawings is an enlarged top plan view of one of the articulateable flap means shown in FIG. 1, showing in particular, the fold lines surrounding the flaps themselves, which substantially correspond to the interior region of the pylon means it will secure, as well as the height maximizing configuration of the flaps themselves.

Substantially, rectangular shaped articulateable flap means, such as articulateable flap means 51, is shown in FIG. 7, prior to the actual articulation 0f flap elements 75 through 78, and accordingly, prior to their abutment and attachment with interior wall, such as interior wall 59, of the respective pylon means, such as pylon means 26, as shown in FIG. 3. As can be seen, this particular shaped flap means 51 has fold lines 72, about the flap elements, which substantially conforms with the interior region of a substantially rectangular shaped pylon means, such as pylon means 26 as shown in FIG. 1. The flap elements 75 though 78 are configured in such a way so as to maximize the height of contact with interior walls, such as interior wall 58, of pylon means, such as pylon means 26, as shown in FIG. 3. Such height and contact maximization is achieved by having the apexes, such as apex 77a, of the opposing side flap elements 76 and 77, abut with the apexes of the adjacently positioned end flap elements 75 and 78. Also shown in FIG. 7 is bottom panel means 23, and adhesive coating 71 as applied to top surface of flap elements 75 through 78, which as previously mentioned, could comprise a polyvinyl acetate adhesive. Adhesive 71a may likewise be positioned on panel 23 about the position of the flaps to adhesively cooperate with the abutting end of the pylon.

Figure 8:
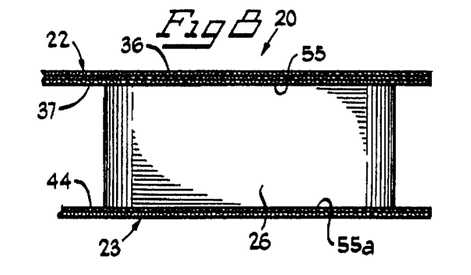
FIG. 8 of the drawings is an elevated side view of a portion of the shipping platform apparatus as shown in FIG. 1, showing in particular, the positioning of one of the pylon means between the platform means and the bottom panel means.

The operable positioning of pylon means, such as pylon means 26, 29, 30 and 31, between platform means 22 and bottom panel means 23, are shown in FIG. 8 and FIG. 9. When shipping platform apparatus 20 is fully assembled, bottom ends, such as bottom end 55a, of the pylon means, such as pylon means 26, will abut in secured attachment with top surface 44 of bottom panel means 23. Likewise, the top ends, such as top end 55, of the pylon means, such as pylon means 26, will abut in secured attachment with bottom surface 37 of platform means 22. As shown in FIG. 1, the top ends, such as top end 55, of each of the pylon means 26 through 34, are coated with an adhesive for attachment to bottom surface 37 of platform means 22. As is true with the articulateable flap means, attachment is accomplished by secured adhesion between the top ends of the pylon means to the bottom surface of the platform means 22. Through such a construction, bottom panel means 23 is attached to the pylons, such as pylon 26, through reinforced bottom attachment panel means including articulatable flap means 51 having articulatable flab elements such as flap elements 75 and 78 adhesively attached at regions 230–231 as well as through adhesive means 230a and 231a applied between the bottom of pylon 26 and the top of bottom panel 23, as shown in FIGS. 4 and 7. The pylon bottom attachment means will be more resistant against shear and torquing forces at the point of attachment between elongated pylons 26 and bottom panel 23 than the non or lesser reinforced pylon top attachment means securing the top ends of the pylon to the bottom surface of platform means 22. The stronger, more resistant securement of the pylons to the bottom panel means 23, as a result of reinforced attachment, through flap elements such as elements 75–78, will first induce failure of a pylon, upon direct or indirect exposure of the pylons to shear and torquing forces, at the pylon top attachment means, before inducing failure of the pylon bottom attachment. This construction protects against a catastrophic cantilevering of the platform means 22 and the potentially substantial load supported thereby, relative to bottom panel means 23—such as when a forklift carrying the platform and a load strikes an adjacent pallet or nonyielding structure, or when the forklift tine strikes a pylon during rapid turning or abrupt maneuvers. Through such a construction, at worst, the pylon top attachment means could fail while maintaining restrained attachment of the bottom panel attachment means to preclude against the lateral and downward displacement (collapse) of platform means 22, with its supported load, which could otherwise cantilever relative to the position of the bottom panel means 23.

As was shown in greater detail in FIG. 1 and FIG. 2, shipping platform apparatus 20, comprises aperture means, such as aperture means 46 and 47. Inasmuch as pylon means, such as pylon means 29 through 31 may be positioned in distally spaced rows, or in otherwise offset positions, entrance of the fork tines of conventional material handling equipment therebetween as shown in FIG. 9, is made possible. When the tines are properly inserted, the weight bearing wheels, such as wheel 220, or other lifting or rolling mechanisms attached near the end of the tines, will be located within apertures, such as aperture 46. Accordingly, such placement will enable shipping platform apparatus 20 to be raised off of the ground surface while simultaneously allowing the wheel, such as wheel 220, of the fork tines, to remain in contact with the ground surface, thereby providing stability during such raising, lowering and transporting of shipping platform apparatus 20. Also shown in FIGS. 8 and 9 are top surface 36 of platform means 22.

Figure 10:
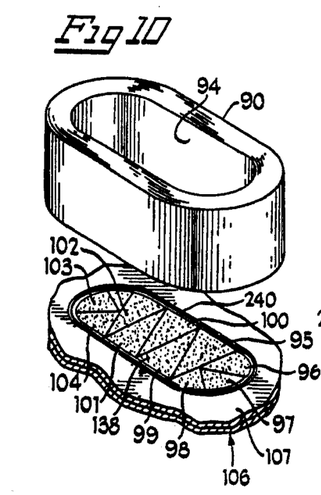
FIG. 10 of the drawings is an exploded perspective view of a substantially oval shaped pylon means, along with the configuration of the respective articulateable flap means used to secure the pylon means to the bottom panel means and, showing in particular, the fold line configuration of the articulateable flap means which substantially conforms to the configuration of the interior region of the oval pylon means.

Three alternative configurations of pylon means, such as pylon means 90 through 93, are shown in FIGS. 10 through 12, along with the respective articulateable flap means configurations used to secure each respective pylon means to the respective bottom panel means 106, 118 and 126. Specifically, pylon means 90 is shown in FIG. 10 as having a substantially oval elongated configuration with an interior region 94 which is also substantially oval. Oval pylon means 90 is secured to top surface 107 of bottom panel means 106, by adhesive contact with flap elements 95 through 104. As can be seen, the flap elements are surrounded by a fold line 240 which substantially conforms to the configuration of interior region 94 of pylon means 90. Furthermore, flap elements 95 through 102 are configured to maximize the height of contact within interior region 94 of pylon means 90, as well as the securement therebetween. Also shown in FIG. 10 is adhesive means 138 as applied to the top surface of each of the flap elements.

Two substantially cylindrically shaped and thus further elongated pylon means 91 and 92, may be positioned adjacent to each other, and secured to top surface 119 of bottom panel means 118, are shown in FIG. 11, along with flap elements, such as flap elements 110 through 117, which are used to secure cylindrically shaped pylon means, such as pylon means 91 and 92, to bottom panel means 118. Flap elements, such as flap elements, 110 through 117 are surrounded by fold lines, such as fold lines 241 and 242, which substantially conform to the configuration of interior regions, such as interior region 120, of cylindrically shaped pylon means, such as pylon means 91 and 92. Furthermore, the star-burst like pattern of flap elements, such as flap elements 110 through 117, facilitate maximum securement and height of contact within interior region, such as interior region 120, of pylon means 91 and 92. Also shown in FIG. 11 is adhesive means, such as adhesive means 139, as applied to the flap elements.

Substantially rectangular shaped elongated pylon means 93 is shown in FIG. 12, as well as the four flap configured flap elements 122 through 125 which are used to secure pylon means 93 to top surface 127 of bottom panel means 126. These flap elements are surrounded by fold line 245 which substantially conforms with interior region 128 of pylon means 93. Each flap element is coated with adhesive means 140 for secured attachment with corresponding pylon means 93. Also shown in FIG. 12 is hole 221 centrically positioned between flap elements 122 through 125.

Figure 13:
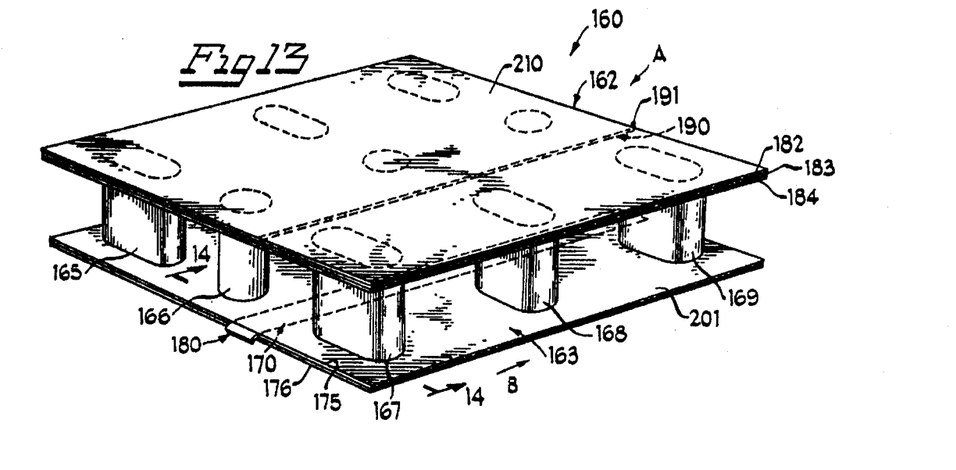
FIG. 13 of the drawings is a perspective view of the shipping platform apparatus, as fully assembled, showing, in particular, the triple corrugated layers of the top panel means, the double corrugated layers of the bottom panel means, as well as the frangability means located in both the platform means and the bottom panel means.
Figure 14:
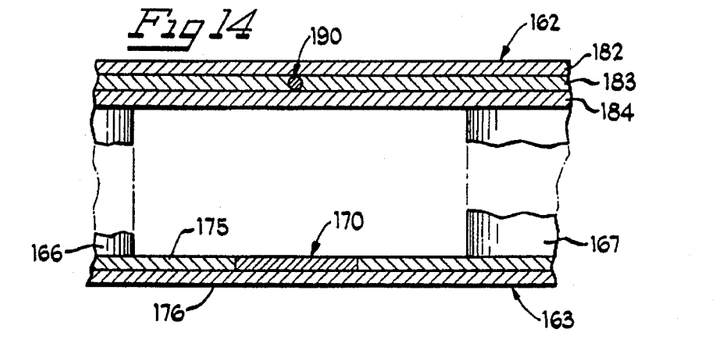
FIG. 14 of the drawings is a fragmentary cross-sectional view of the shipping platform apparatus of FIG. 13, taken along lines 14—14 of FIG. 13 and looking the direction of the arrows, particularly showing the tear strip embedded in the middle corrugated layer of the platform means and the tear strip embedded within the top corrugated layer of the bottom panel means.

Shipping platform apparatus 160 is shown in FIG. 13 and FIG. 14 as including platform means 162, bottom panel means 163, and pylon means, such as pylon means 165 through 169 operably positioned and secured therebetween. Platform means 162 is constructed with a top corrugated layer 182, middle corrugated layer 183, and bottom corrugated layer 184. Bottom panel means 163 is shown as having a double corrugated layer consisting of a top corrugated layer 175 and a bottom corrugated layer 176. While FIG. 13 shows an alternative construction, it is preferred that the corrugation pattern of platform means 162 be offset approximately 90 degrees to the corrugation pattern of bottom panel means 163, for optimal strength. Platform means 162 further includes tear strip 190 embedded within middle corrugated layer 183 and positioned across the entire width of platform means 162. Tear strip 190, here a wire tear strip includes pull tab 191 which facilitates removal of the tear strip when pulled in the direction of the arrow A. Additionally, bottom panel means 163 also includes tear strip 170. Tear strip 170, here a tape tear strip, is embedded within top corrugated layer 175 for facilitating total severing of bottom panel means 163 upon pulling pull tab 180 in the direction of the arrow B, as will be more fully explained. Also shown in FIG. 13 are top surfaces 210 and 201 of platform means 162, and bottom panel means 163, respectively.

Figure 15:
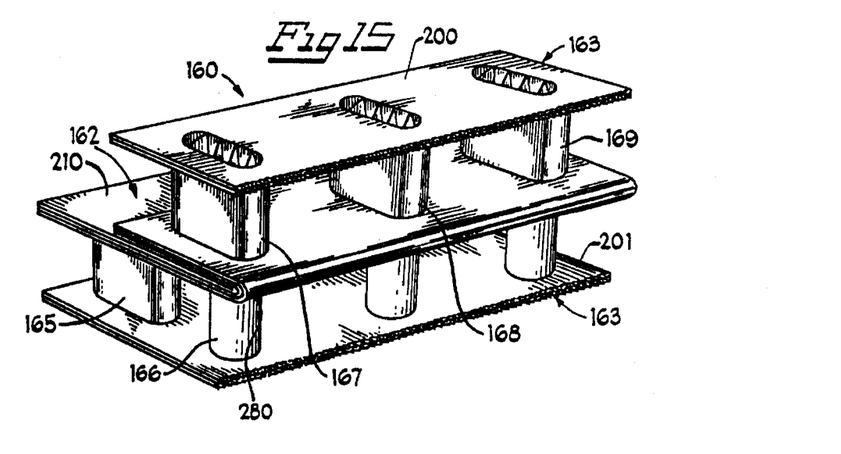
FIG. 15 of the drawings is a perspective view of the shipping platform apparatus of FIGS. 13 and 14 after the tear strips have been removed from the respective corrugated layers of the apparatus, showing in particular, the completely severed bottom panel means in position over the partially severed platform means.

Shipping platform apparatus 160 is shown in FIG. 15 after tear strip 190 has been removed from middle corrugated layer 183 of platform means 162, and after tear strip 170 has been removed from top corrugated layer 175 of bottom panel means 163, as shown in FIG. 13. Inasmuch as tear strip 190 is embedded in middle corrugated layer 183, its removal, by pulling tab 191 in the direction of the arrow A, will only cause the top two corrugated layers 182 and 183 to sever, as shown in FIG. 13. Accordingly, bottom corrugated layer 184 remains substantially intact yet foldable due to the reduced strength of platform means 162 (as a result of the partial severing), at fold point 280.

To actually induce foldability of platform means 162, tear strip 170 must be pulled in the direction of arrow B, as shown in FIG. 13, after apparatus 160 has been flipped over so that top surface 210 of platform means 162 is adjacent to the ground surface. Accordingly, since tear strip 170 is embedded within top layer 175 of bottom panel means 163, complete severing of bottom panel means 163 will occur. Once bottom panel means 163 is completely severed, and top two layers 182 and 183 of platform means 162 are completely severed, shipping platform apparatus 160, can be folded over at fold line 280 so as to substantially reduce the overall dimension of the apparatus 160. Such reduction in size will thereby facilitate disposal of shipping platform apparatus 160 in a convetional compactor or other type of refuse bin after use. Also shown in FIG. 15 is top and bottom surfaces 201 and 200, respectively, of bottom panel means 163, and pylon means 165 through 169.

Figure 16:
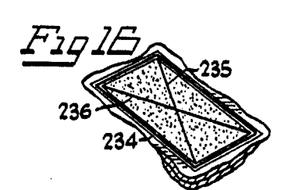
FIG. 16 of the drawings is a perspective view of one type of articulateable flap means, showing in particular, the fold lines surrounding the flaps themselves, which substantially correspond to the interior region of the pylon means it will secure, as well as the height and width-maximizing configuration of the flaps themselves.
Figure 17:
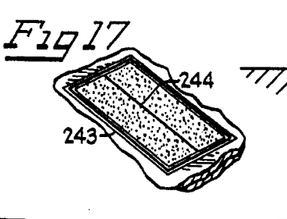
FIG. 17 of the drawings is a perspective view of one type of articulateable flap means showing in particular, the fold lines surrounding the flaps themselves, which substantially correspond to the interior region of the pylon means it will secure, as well as the width-maximizing configuration of the flaps themselves.

Additional contemplated flap element configurations are shown in FIGS. 16, 17 and 18 prior to the actual articulation of the respective flap elements to the inner wall of a corresponding pylon. Specifically, FIGS. 16, 17 and 18 each show flap means 234, 243 and 245, respectively, which are configured for attachment to pylons having substantially rectangular configurations. Flap means 234, as shown in FIG. 16, is shown having separation lines 235 and 236, which define four triangular shaped flap elements. Flap means 243, as shown in FIG. 17, includes separation line 244 which define two substantially rectangular flap elements. Flap means 245, as shown in FIG. 18, includes one separation line 246. However, unlike separation line 244 in FIG. 17, separation line 246 defines two triangular shaped flap elements. All of these flap configurations are contemplated as alternatives for maximizing, alternatively, the width and/or height of contact, to accordingly enhance securement to, the respective interior wall of a rectangular shaped pylon.

Flap means 247 is shown in FIG. 19 prior to articulation of the individual flap elements, and accordingly prior to attachment to a pylon similar in shape to the outer peripheral elongated hexagonal configuration of flap means 247. As can be seen, flap means 247, comprises six separation lines 248, 249, 251, 252, 253 and 254 which serve to define six triangular shaped flap elements. Such a configuration is contemplated for purposes of maximizing the height of contact to accordingly enhance adhesive securement to a pylon having an interior wall with a configuration substantially similar to the elongated hexagonal shape of flap means 247.

The foregoing description and drawings merely explain and illustrate the invention and the invention is not limited thereto except insofar as the appended claims are so limited, as those skilled in art who have the disclosure before them will be able to make modifications and variations therein without departing from the scope of the invention.

What is claimed is:

1. A substantially recyclable shipping platform apparatus for supporting and transporting loads by conventional tined material handling devices, which apparatus is easily disposable and substantially recyclable after use, said shipping platform apparatus comprising:

substantially flat planar load-bearing platform means for supporting said load, said platform means formed of a substantially paper material and having a top surface and a bottom surface opposite said top surface, wherein said load is capable of resting upon said top surface during the storage and transporting of said load;

substantially flat planar bottom panel means positioned substantially parallel to, and distally spaced below said platform means, for supporting and bearing the weight of both said platform means and said load, said bottom panel means formed of a substantially paper material and having a top surface and a bottom surface opposite said top surface;

one or more tubular shaped pylon means formed of elements independent from said platform means and said bottom panel means, each of said pylon means being operably positioned between said platform means and said bottom panel means so as to facilitate the insertion, maintenance and removal of the tines of said conventional tined material handling devices therebetween, each of said tubular shaped pylon means having a top end and a bottom end opposite said top end, an outer surface, and an interior region having an inner surface, said top end of at least one of said tubular shaped pylon means being operably secured substantially adjacent to said bottom surface of said platform means, and said bottom end of said at least one of said pylon means being operably secured substantially adjacent to said top surface of said bottom panel means; and pylon top attachment means for operably securing said top end of said at least one said tubular shaped pylon means adjacent to said bottom surface of said platform means and pylon bottom attachment means for operably securing said bottom end of said at least one said tubular shaped pylon means adjacent to said top surface of said bottom panel means, said pylon bottom attachment means having a reinforced construction relative to the construction of said respective said pylon top attachment means so as to controllably provide for greater resistance to shear and torquing forces applied against said at least one tubular shaped pylon means, than the resistance of said pylon top attachment means to said forces;

said greater resistance against said substantial shear and torquing forces of said pylon bottom attachment means controllably inducing failure of said pylon top attachment means before failure of said pylon bottom attachment means upon exposure to said forces, to preclude against the inadvertent cantilevering and collapse of said platform means and said supported load, relative to said bottom panel means.

2. The substantially recyclable shipping platform apparatus according to claim 1 in which the invention further comprises aperture means operably positioned within said bottom panel means so as to enable effective cooperation of said shipping platform apparatus with said conventional material handling devices positionable between both said platform means and said bottom panel means during raising, relocation and lowering of said shipping platform apparatus and, in turn, said load.

3. The invention according to claim 1 in which said pylon bottom attachment means comprises a plurality of articulateable flap means integrally formed within said bottom panel means about a configuration of folds that closely match the shape of said interior region of said pylon means, for attachment of said articulateable flap means to said inner surface of said interior region of said pylon means proximate to the bottom ends of said pylon means;

said articulateable flap means having a first side and a second side opposite said first side, said first side being operably attachable to said inner surface of said interior region of said pylon means by adhesive attachment means positioned therebetween.

4. The invention according to claim 3 in which the bottom end of each of said pylon means are further secured to said bottom panel means by adhesive attachment means positioned between the bottom ends of said pylon means and the region of said bottom panel means immediately surrounding said configuration of articulateable flap means folds.

5. The invention according to claim 4 in which said articulateable flap means are each configured to have a maximized height with respect to attached contact with said inner surface of said interior region of said pylon means, for optimal securement and stabilization of said pylon means to said bottom panel means.

6. The invention according to claim 5 in which said articulateable flap means comprise a first side flap, a second side flap, a first end flap and a second end flap, each of which have a scalene triangular configuration;

said first and second side flaps being positioned contiguous to each of said first and second end flaps, said first side flap having its apex in abutment with the apex of said first end flap, and said second side flap having its apex in abutment with said second end flap so as to form a configuration which maximizes the height of attachment of said articulateable flap means to said inner surface of said interior region of said pylon means.

7. The invention according to claim 5 in which said articulateable flap means comprise a plurality of triangular shaped flaps operably positioned within a substantially oval configuration;

each of said triangular shaped flaps being arranged in a substantially interwoven configuration so as to maximize the height of attachment of said articulateable flap means to said inner surface of said interior region of said pylon means.

8. The invention according to claim 3 in which said adhesive attachment means comprises a polyvinyl acetate adhesive material.

9. The invention according to claim 1 in which said pylon top attachment means includes adhesion attachment means operably positioned between the top end of each of said pylon means and at least a portion of said bottom surface of said platform means for restrained securement therebetween.

10. The invention according to claim 9 in which said pylon top attachment means comprise a plurality of articulateable flap means integrally formed within said platform means about a configuration of folds that closely match the shape of said interior region of said pylon means for attachment of said articulateable flap means to said inner surface of said interior region of said pylon means proximate to the bottom ends of said pylon means;

said articulateable flap means having a first side and a second side opposite said first side, said first side being operably attachable to said inner surface of said interior region of said pylon means by adhesive attachment means positioned therebetween.

11. The invention according to claim 10 in which said articulateable flap means are each configured to have a maximized height with respect to attached contact within said inner surface of said interior region of said pylon means, for optimal securement and stabilization of said pylon means to said platform means.

12. The invention according to claim 11 in which said articulateable flap means comprise a first side flap, a second side flap, a first end flap and a second end flap, each of which have a scalene triangular configuration;

said first and second side flaps being positioned contiguous to each of said first and second end flaps, said first side flap having its apex in abutment with the apex of said first end flap, and said second side flap having its apex in abutment with said second end flap so as to form a configuration which maximizes the height of attachment of said articulateable flap means to said inner surface of said interior region of said pylon means.

13. The invention according to claim 11 in which said articulateable flap means comprise a plurality of triangular shaped flaps operably positioned within a substantially oval configuration;

each of said triangular shaped flaps being arranged in a substantially interwoven configuration so as to maximize the height of attachment of said articulateable flap means to said inner surface of said interior region of said pylon means.

14. The invention according to claim 10 in which said adhesive attachment means comprises a polyvinyl acetate adhesive material.

15. The invention according to claim 1 in which at least one of said one or more substantially elongated continuously uninterrupted tubular shaped pylon means comprise a relatively oval shaped pylon member configuration.

16. The invention according to claim 1 in which at least one of said one or more substantially elongated continuously uninterrupted tubular shaped pylon means comprise a relatively rectangular shaped pylon member configuration.

17. The invention according to claim 1 in which at least one of said one or more substantially elongated continuously uninterrupted tubular shaped pylon means comprise two or more relatively non-elongated members substantially adjoining one another peripherally and in abutting succession to thereby create a substantially elongated, continuously uninterrupted tubular shaped pylon member.

\* \* \* \* \*

UNITED STATES PATENT AND TRADEMARK OFFICE
CERTIFICATE OF CORRECTION

PATENT NO. : 5,590,606
DATED : Jan. 7, 1997
INVENTOR(S) : Crews et al.

It is certified that error appears in the above-identified patent and that said Letters Patent is hereby corrected as shown below:

| | |
|---|---|
| Col. 1, Ln. 65 | after "strength" delete ";" and insert instead --,-- |
| Col. 5, Ln. 42 | delete comma after "as" |
| Col. 5, Ln. 47 | after "Fig. 1" insert --of-- |
| Col. 7, Ln. 22 | insert comma after "flap means" |
| Col. 8, Ln. 11 | delete "corrugation," and insert instead --corrugations-- |
| Col. 8, Ln. 17 | after "top end, such" insert --as top-- |
| Col. 10, Ln. 16 | delete "Of" and insert instead --of-- |

Signed and Sealed this

Thirtieth Day of June, 1998

Attest:

BRUCE LEHMAN

*Attesting Officer*       *Commissioner of Patents and Trademarks*